US008366119B2

(12) United States Patent  
Rimet

(10) Patent No.: US 8,366,119 B2  
(45) Date of Patent: Feb. 5, 2013

(54) TOOL WITH REPLACEABLE TIP

(75) Inventor: Lilian Rimet, Saint Sauveur (FR)

(73) Assignee: Seco Tools AB, Fagersta (SE)

( * ) Notice: Subject to any disclaimer, the term of this patent is extended or adjusted under 35 U.S.C. 154(b) by 1294 days.

(21) Appl. No.: 12/058,898

(22) Filed: Mar. 31, 2008

(65) Prior Publication Data

US 2008/0238000 A1   Oct. 2, 2008

(30) Foreign Application Priority Data

Mar. 30, 2007   (SE) ...................................... 0700858

(51) Int. Cl.
*B23B 31/107* (2006.01)
(52) U.S. Cl. ........................................... 279/71; 279/81
(58) Field of Classification Search .................. 279/71, 279/69, 70, 72, 73, 81, 74, 75, 82, 904, 905; 408/240
See application file for complete search history.

(56) References Cited

U.S. PATENT DOCUMENTS

| | | | | |
|---|---|---|---|---|
| 685,677 | A * | 10/1901 | Furbish | 279/69 |
| 2,537,179 | A * | 1/1951 | Albertson et al. | 279/69 |
| 4,113,405 | A * | 9/1978 | Dillinger | 408/226 |
| 4,188,041 | A * | 2/1980 | Soderberg | 279/75 |
| 4,209,182 | A | 6/1980 | Sheldon | |
| 4,234,277 | A | 11/1980 | Benson et al. | |
| 4,664,567 | A * | 5/1987 | Edwards | 408/59 |
| 4,726,719 | A * | 2/1988 | Mack | 408/240 |
| 4,749,316 | A * | 6/1988 | Hendricks | 408/239 R |
| 4,762,444 | A * | 8/1988 | Mena | 408/59 |
| 4,830,549 | A * | 5/1989 | Neumaier et al. | 408/9 |
| 5,222,848 | A | 6/1993 | Kuang-Wu | |
| 5,271,697 | A | 12/1993 | Johnson et al. | |
| 5,397,203 | A * | 3/1995 | Kleine et al. | 408/226 |
| 5,558,478 | A * | 9/1996 | Odendahl et al. | 408/226 |
| 5,577,743 | A * | 11/1996 | Kanaan et al. | 279/72 |
| 6,261,035 | B1 * | 7/2001 | Moores et al. | 408/239 R |
| 6,588,993 | B2 * | 7/2003 | Omi | 408/226 |
| 6,726,222 | B2 * | 4/2004 | Rohm et al. | 279/71 |
| 6,932,358 | B1 * | 8/2005 | Geisman et al. | 279/71 |
| 6,988,734 | B2 * | 1/2006 | Zierpka | 279/75 |
| 2001/0013682 | A1 * | 8/2001 | Frauhammer et al. | 279/19.4 |

OTHER PUBLICATIONS

International Search Report for corresponding International Application PCT/SE2008/050332.

* cited by examiner

*Primary Examiner* — Daniel Howell  
*Assistant Examiner* — Paul M Janeski  
(74) *Attorney, Agent, or Firm* — WRB-IP LLP

(57) ABSTRACT

A tool with a replaceable tip includes a tool body including a tip holding portion, a tool tip having a shank portion adapted to be disposed proximate the tip holding portion comprising a wall defining an axial opening, the wall having at least one radial opening, at least one locking element being disposed in the radial opening, and, as a clamping ring is turned about the longitudinal axis of the tool body, a locking element contacting surface of the clamping ring contacts the locking element and urges it through the radial opening and into the recess in the tool tip. A method of retaining a tool tip is also disclosed.

18 Claims, 6 Drawing Sheets

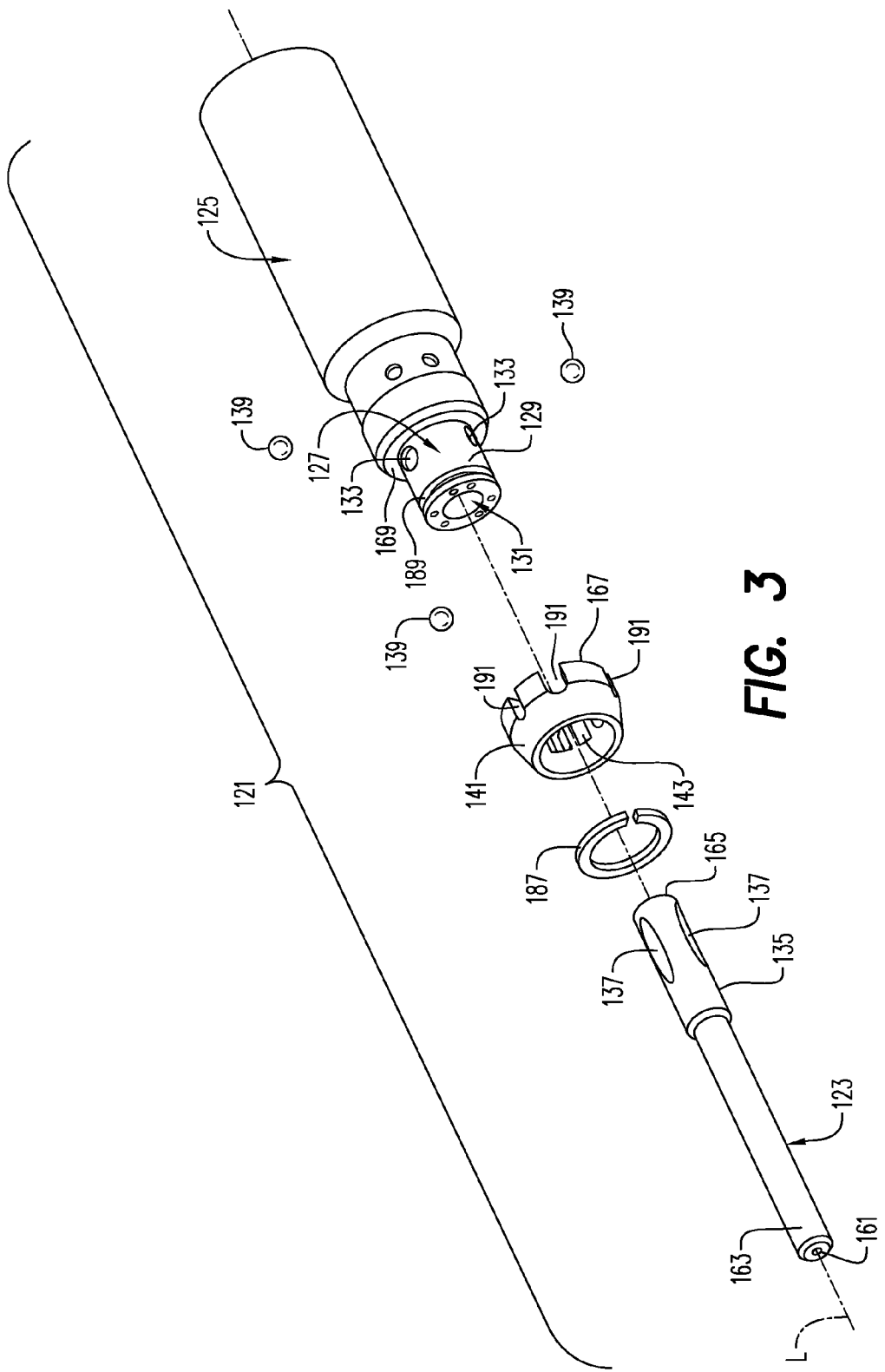

TOOL WITH REPLACEABLE TIP

BACKGROUND AND SUMMARY

The present invention relates to a tool with a replaceable tip and, more particularly, to a tool with a replaceable tip that is secured relative to a tip holding portion by a clamping ring.

Various structures for securing a tip relative to a tool body are known. It is, for example, known to secure a tip relative to a tool body by means of a chuck that has clamping surfaces that can be moved, ordinarily by a key and gear arrangement, toward the tip to clamp it and away from the tip to unclamp it. It is also known to secure a tip relative to a tool body by a heat shrink technique wherein the tip holding portion of the tool body is heated so it expands sufficiently to receive the tip and, when the tip holding portion cools, the tip holding portion contracts and secures the tip relative to the tool body.

It is desirable to provide a tool with a replaceable tip that is easily attached and removed relative to the tool body. It is also desirable to provide an arrangement for easily attaching and removing a tip relative to a tool body.

According to an aspect of the present invention, a tool with a replaceable tip comprises a tool body comprising a tip holding portion, a tool tip having a shank portion adapted to be disposed proximate the tip holding portion, the shank portion having at least one recess, at least one locking element adapted to be received in the at least one recess, and a clamping ring, an interior diameter of a locking element contacting surface of the clamping ring decreasing in a circumferential direction such that, when the clamping ring is disposed around the tool tip such that the at least one locking element is disposed between the locking element contacting surface and the at least one recess and the clamping ring turns in a first direction about a longitudinal axis of the tool body relative to the tool tip, the locking element contacting surface contacts the at least one locking element and urges it into the at least one recess in the tool tip.

According to another aspect of the present invention, a method of retaining a replaceable tip in a tool comprises positioning a tool tip having a shank portion such that the shank portion is disposed proximate a tip holding portion of a tool body, the shank portion having at least one recess, positioning at least one locking element adapted to be received in the at least one recess proximate the at least one recess, positioning a clamping ring around the shank portion of the tool tip such that the at least one locking element is disposed between the at least one recess and a locking element contacting surface of the clamping ring, an interior diameter of a locking element contacting surface of the clamping ring decreasing in a circumferential direction, and turning the clamping ring in a first direction about a longitudinal axis of the tool body relative to the tool tip such that the locking element contacting surface contacts the at least one locking element and urges it into the at least one recess in the tool tip.

BRIEF DESCRIPTION OF THE DRAWINGS

The features and advantages of the present invention are well understood by reading the following detailed description in conjunction with the drawings in which like numerals indicate similar elements and in which:

FIG. 3 is a perspective, partially exploded view of a tool with a replaceable tip according to an embodiment of the present invention;

DETAILED DESCRIPTION

Figure 1:
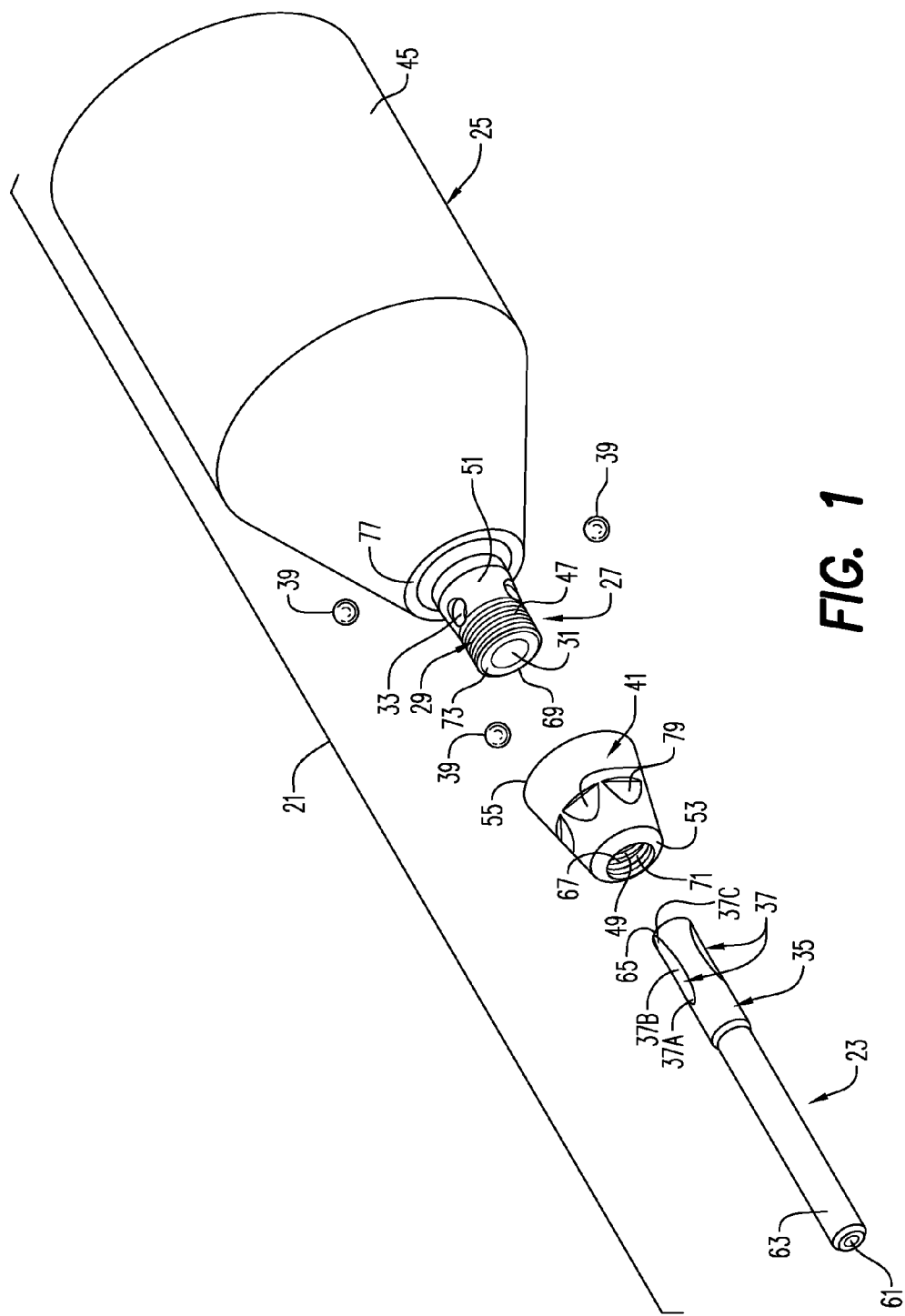
FIG. 1 is a perspective, partially exploded view of a tool with a replaceable tip according to an embodiment of the present invention.
Figures 2A, 2B:
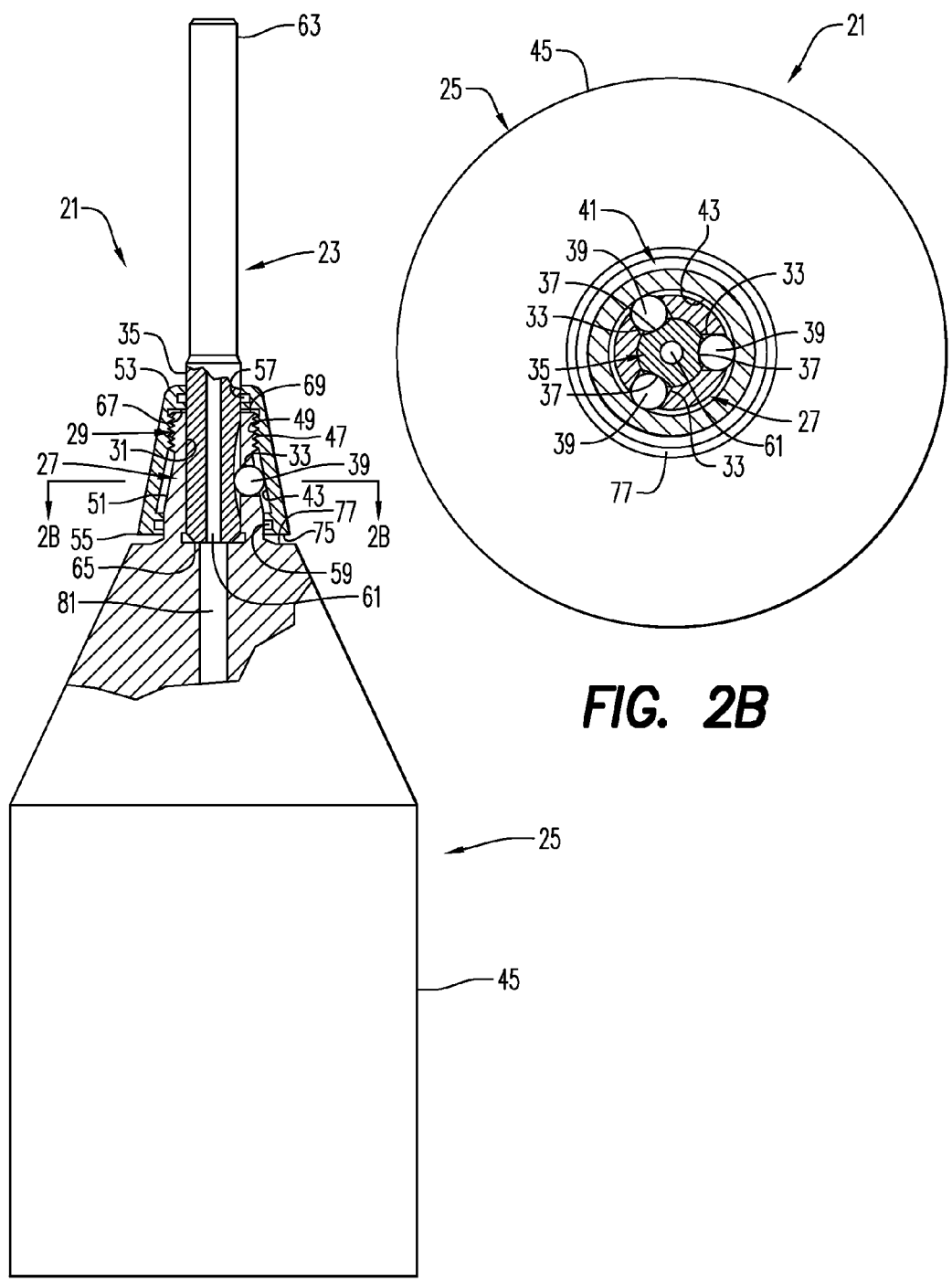
FIG. 2A is a side, partially cross-sectional view of a tool with a replaceable tip according to an embodiment of the present invention.
FIG. 2B is a cross-sectional view taken at Section 2B-2B of FIG. 2A.

A tool 21 with a replaceable tip 23 according to an embodiment of the present invention is shown in FIGS. 1-2B. The tool 21 comprises a tool body 25 comprising a tip holding portion 27. The tip holding portion 27 comprises a wall 29 defining an axial opening 31. The wall 29 has at least one radial opening 33.

The tool tip 23 has a shank portion 35 adapted to be disposed in the tip holding portion 27. The shank portion 23 has at least one recess 37.

At least one locking element 39 is adapted to be received in corresponding ones of the at least one radial opening 33 and the at least one recess 37. The locking element 39 is ordinarily a ball, however, other forms of locking elements can be used. For example, instead of providing a ball, the locking element 39 can be in the form of a pin or a ring with at least one protrusion for being received in the recess 37.

A clamping ring 41 is attachable to the tool body 25. An interior diameter of a locking element contacting surface 43 of the clamping ring 41 decreases in a direction away from a major portion 45 of the tool body 25. The locking element contacting surface 43 is arranged such that, as the clamping ring 41 is moved toward the major portion 45 of the tool body 25, the locking element contacting surface contacts the at least one locking element 39 and urges it through the at least one radial opening 33 in the tip holding portion 27 and into the at least one recess 37 in the tool tip 23.

In another embodiment (not shown), the radial opening in the tip holding portion can be omitted and the locking element contacting surface on the clamping ring can urge the locking element into the recess in the shank at some point along the length of the shank without also urging it through a radial opening in the tip holding portion. In such an embodiment, the tip holding portion may be, for example, a surface of the tool body against which an end of the shank abuts, while the clamping ring might function to align the tool tip relative to the tool body. In the embodiment shown in FIGS. 1-2B, the wall 29 defining the axial opening 31 in the tip holding portion 27 functions to align the tool tip 23 relative to the tool body 25.

In a presently preferred embodiment, there are at least three each of the radial opening 33, the recess 37, and the locking element 39. In this way, clamping force is distributed relatively uniformly between the three balls, the clamping ring 41, and the shank 35.

Ordinarily, the locking element contacting surface 43 of the clamping ring 41 is frustoconical. It can, however, be other shapes, such as curved, stepped, and the like. Ordinarily, the locking element contacting surface 43 has a smaller diameter in a direction away from the major portion 45 of the tool body 25 than closer to the major portion of the tool body. The clamping ring 41 is ordinarily attachable to the tool body 25 by an external thread 47 on the tip holding portion 27 and an internal thread 49 of the clamping ring. As the clamping ring 41 is screwed onto the tip holding portion 27, the diameter of the locking element contacting surface 43 adjacent the locking element 39 decreases and the locking element contact surface will urge the locking element into the recess 37 in the shank 35.

An exterior portion 51 of the tip holding portion 27 that is disposed proximate the locking element contacting surface 43 of the clamping ring 41 when the clamping ring is attached to the tool body 25 can be formed so as to decrease in diameter in a direction away from the major portion 45 of the tool body. Ordinarily the slope of the exterior portion 51 of the tip holding portion 27 will correspond to the slope of the locking element contacting surface 43. A gasket can be provided between at least one end of the clamping ring 41 and the tip holding portion 27. Ordinarily, the clamping ring 41 has first and second ends 53 and 55, and a first gasket 57 is disposed between the first end of the clamping ring and the tip holding portion 27 and a second gasket 59 is disposed between the second end of the clamping ring and the tip holding portion. The first and second gaskets 57 and 59 may be fitted in grooves formed in the clamping ring 41 or on the tip holding portion 27.

The shank portion 35 can have an axial opening 61. The axial opening 61 can be non-circular (non-circular opening 161 shown in phantom in FIG. 5B) to facilitate removing the shank portion 35 from the tip holding portion 27 and the clamping ring 41 in the event that a working end 63 of the tip breaks off. The axial opening 61 may extend from the end 65 of the shank 35 to the working end 63 and can be useful for introducing lubricant or flushing liquid to a location on a workpiece on which the tip 23 is performing an operation. The axial opening 61 can be arranged to communicate with an opening 81 in the tool body 25.

The recess 37 in the shank 35 can be axially elongated and taper from a shallow end 37A farthest from the shank end 65 to a deepest portion 37B proximate a mid-point of the recess and back to a shallow end 37C proximate the shank end. The depth of the recess gets larger toward the center, away from the ends 37A and 37C. The deepest portion 37B of the recess 37 will ordinarily be closer to the first, shallow end 37A than to the second, shallow end 37C. The deepest portion 37B of the recess 37 can be defined by a first radius in an axial cross-section and by a second radius in a radial cross-section. The first radius may be 5 to 10 times greater than the second radius. Providing an axially elongated recess 37 can facilitate positioning of the locking element 39 between the tip 23 and the locking element contacting surface 43 of the clamping ring 41. As a smaller diameter portion of the locking element contacting surface 43 of the clamping ring 41 comes closer to a deepest part 37B of the recess 37, the locking element 39, by sliding or rolling relative to the recess, can tend to urge the shank 35 into a particular position relative to the clamping ring 41 and the tool body 25 until, when the clamping ring 41 is screwed on as tightly as desired, the locking element is disposed in the recess 37 in the deepest portion 37B of the recess. As the clamping ring 41 is unscrewed, the locking element will have more and more play, and the shank 35 will be have the ability to move in a limited fashion relative to the tool body 25 until the locking element contacting surface 43 no longer prevents the locking element from completely moving out of the recess 37, at which time the shank will be completely removable from the tip holding portion 27.

The clamping ring 41 can be screwed onto the tool body 25 and/or the tip holding portion 27 until friction between the locking element contacting surface 43, the locking element 39, and the recess 37 prevents the clamping ring 41 from being screwed on any further. More typically, however, the clamping ring 41 will have an abutment surface 67 extending generally transversely to a longitudinal axis of the clamping ring. The abutment surface 67 will contacting an abutment surface 69 of the tip holding portion 27 or the tool body 25 when the clamping ring is in a mounted position relative to the tool body. In FIG. 2A, the clamping ring abutment surface 67 is part of an interior lip portion 71 (FIG. 1) of the clamping ring, and the interior lip portion of the clamping ring is disposed proximate the first end 53 of the clamping ring farthest from the major portion 45 of the tool body 25. The clamping ring abutment surface 67 abuts an abutment surface 69 on an end 73 of the tip holding portion 27. Instead of providing a clamping ring abutment surface on an interior lip portion of the clamping ring 41, a clamping ring abutment surface can be a surface 75 disposed at the second end 55 of the clamping ring 41 and can abut a surface 77 on the tool body behind the tip holding portion 27.

The clamping ring 41 can be provided with external flats 79 or other suitable surfaces for being contacted by a tool such as a wrench to facilitate tightening of the clamping ring 41 relative to the tool body 25.

The tool 21 can be a rotating tool, such as a milling tool, a drilling tool, a boring tool, and the like. The clamping ring 41 can be attachable to the tool body 25 by an external thread 47 on the tip holding portion 27 and an internal thread 49 of the clamping ring 41. The external thread and the internal thread can tighten relative to each other when a torque is applied so that one of the threaded members is turned in a direction opposite a direction of rotation of the rotating tool. In this way, rotation of the tool 21 during normal operation will not tend to loosen the clamping ring 41. It will be understood, however, that the tool 21 need not be a rotating tool, and the present invention has numerous applications outside of rotating tools.

A tool 121 with a replaceable tip 123 according to another aspect of the present invention is shown in FIGS. 3 and 5A-5D. The tool 121 comprises a tool body 125 comprising a tip holding portion 127, a tool tip 123 having a shank portion 135 adapted to be disposed proximate the tip holding portion 127, the shank portion having at least one recess 137, and at least one locking element 139 adapted to be received in the at least one recess 137. The at least one recess 137 is ordinarily axially elongated. The at least one locking element 139 is ordinarily a ball.

Figure 4A:
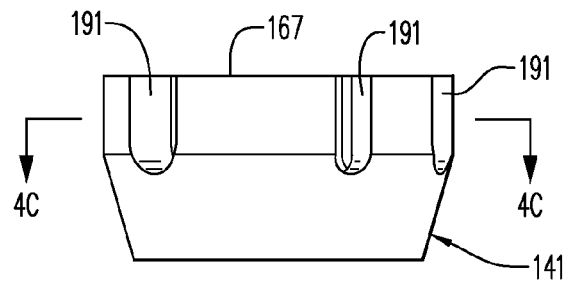
FIGS. 4A-4B are side and bottom views of a clamping ring according to an embodiment of the present invention.
Figure 4B:
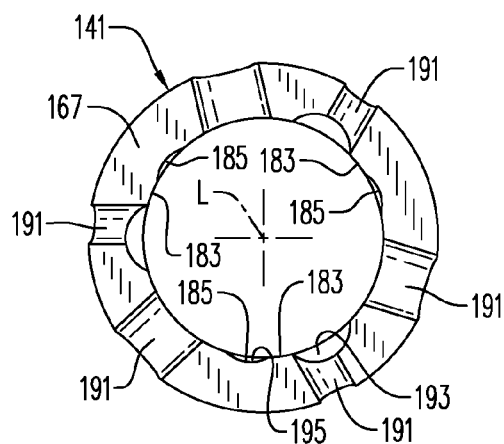
Figure 4C:
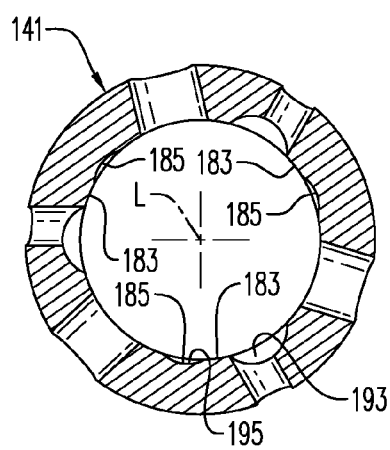
FIG. 4C is a cross-sectional view of the clamping ring of FIG. 4A taken at section 4C-4C of FIG. 4A.

A clamping ring 141 is also provided and is shown by itself in FIG. 4A. As seen in FIGS. 4B-4C, an interior diameter of a locking element contacting surface 143 of the clamping ring 141 decreases in a circumferential direction. When the clamping ring 141 is disposed around the tool tip 123 such that the at least one locking element 139 is disposed between the locking element contacting surface 143 and the at least one recess 137 and the clamping ring turns in a first direction D1 about a longitudinal axis L of the tool body 125, the locking element contacting surface 143 contacts the at least one locking element 139 and urges it into the at least one recess 137 in the tool tip 123. The tool 121 ordinarily comprises at least three each of the recess 137, the locking element 139, and the locking element contacting surface 143.

The tip holding portion 127 can comprise a wall 129 defining an axial opening 131 in which the shank portion 135 of the tool tip 123 can be received. The wall 129 can have at least one radial opening 133 and the at least one locking element 139 can be disposed in the at least one radial opening 133. As the clamping ring 141 is turned about the longitudinal axis of the tool body 125, the locking element contacting surface 143 of the clamping ring contacts the at least one locking element 139 and urges it through the at least one radial opening 133 and into the at least one recess 137 in the tool tip 123.

Figure 5A:
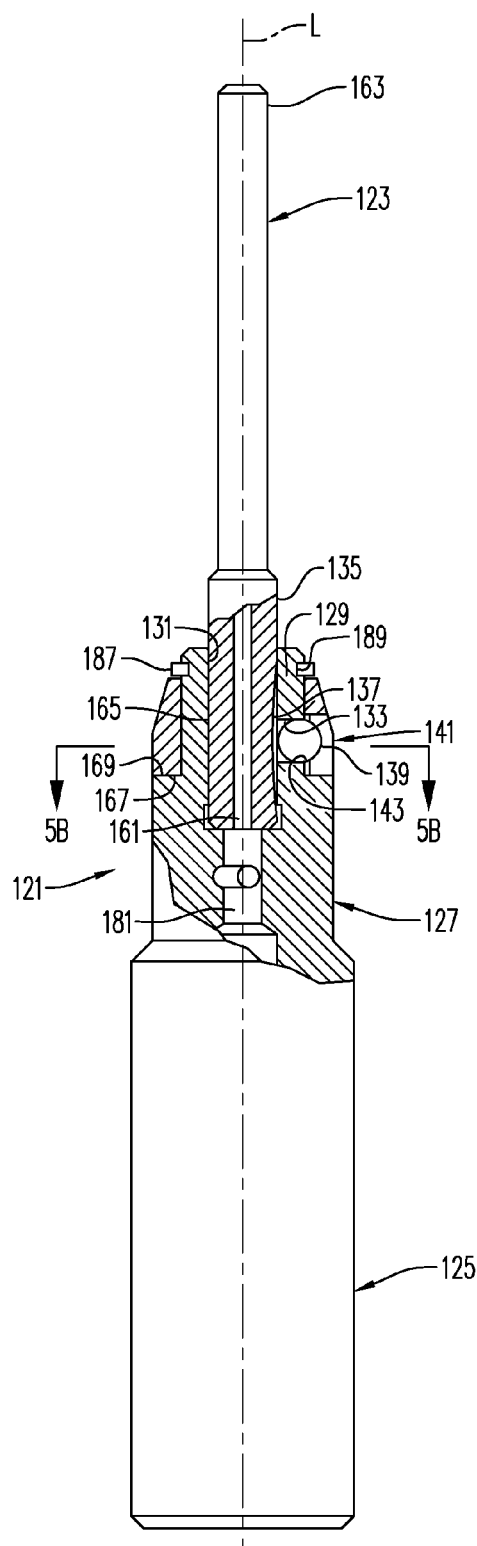
FIGS. 5A and 5C are side, partially cross-sectional views of a tool according to an embodiment of the present invention, with the tool tip not retained by a locking element in FIG. 5A and retained by a locking element in FIG. 5C, and FIGS. 5B and 5D are cross-sectional views taken at sections 5B-5B and 5D-5D of FIGS. 5A and 5C, respectively.
Figure 5C:
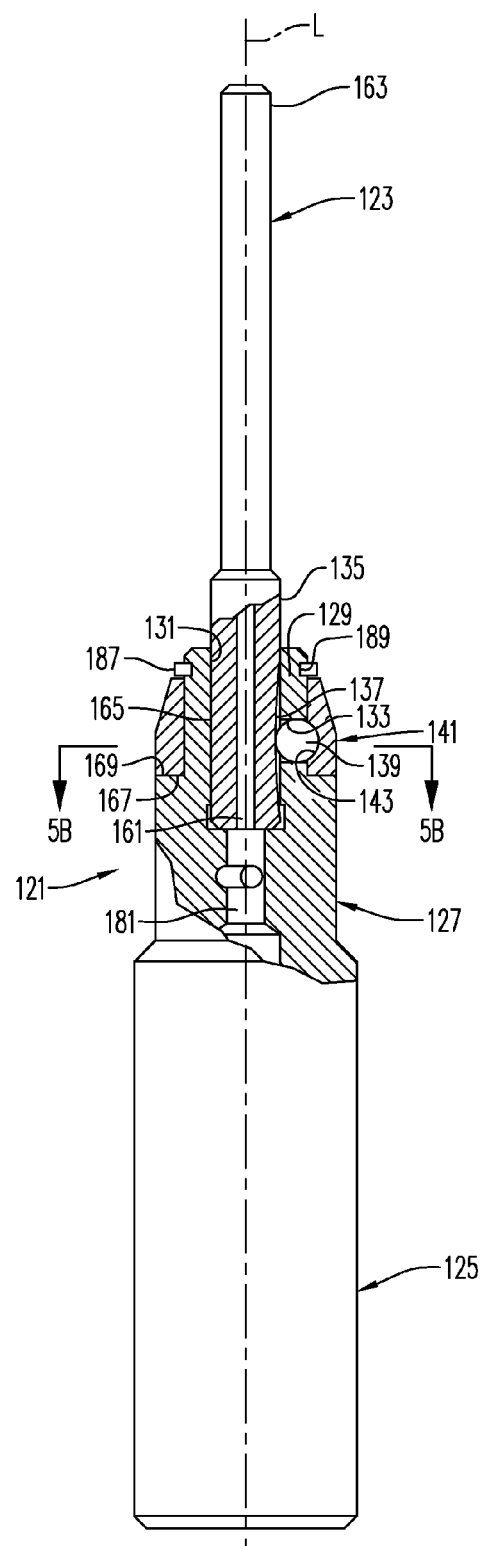
Figure 5B:
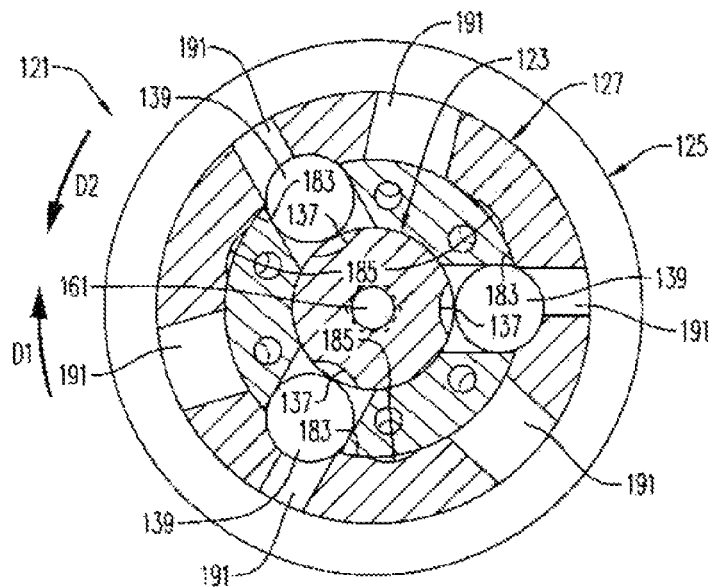
Figure 5D:
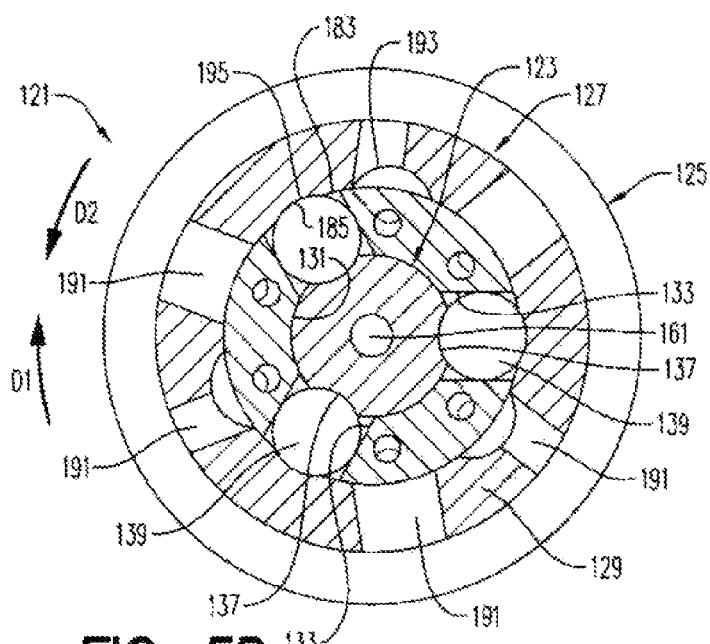

The locking element contacting surface 143 of the clamping ring 141 can comprise a protrusion 183 as seen in FIGS. 5B and 5D. The protrusion 183 is disposed at a lesser distance from the longitudinal axis L of the tool 121 than the at least one locking element 139 when the at least one locking element is disposed in the at least one recess 137. When the clamping ring 141 turns in the first direction D1 relative to the tool tip 123, the protrusion 183 contacts the at least one locking element 139 and the clamping ring 141 deforms elastically outwardly. To facilitate deformation of the clamping ring proximate the protrusion 183, the clamping ring 141 comprises at least two axially extending slots 191, the protrusion 183 being disposed between the two slots.

As seen for example in FIGS. 4B-4C, the locking element contacting surface 143 comprises a pocket 185 defined at least in part by the protrusion 183. The locking element contacting surface 143 is shaped such that the at least one locking element 139 (not seen in FIGS. 4A-4C) is in a non-retained position when the at least one locking element 139 is disposed on a first side 193 of the protrusion 183 and is in a retained position in the pocket 185 on a second side 195 of the protrusion 183. The at least one locking element 139 is adapted to move radially out of the at least one recess 137 in the non-retained position and is unable to move radially out of the at least one recess 137 in the retained position, i.e., except upon turning the clamping ring 141 in a second direction D2 relative to the tool tip 123, opposite the first direction D1, with sufficient torque to deform the clamping ring so that the locking element is able to pass under the protrusion. The tool tip 123 will ordinarily be part of a rotating tool that performs a cutting operation when the tool tip is rotated in the second direction D2 such that, during a cutting operation, torque on the tool tip will tend to move the tool tip 123 toward the retained position.

The clamping ring 141 can be axially retained on the tool body 125 by a circlip 187 that is received in a circumferential recess 189 on the tip holding portion 127. The shank portion 135 can have an axial opening 161. The axial opening 161 can be non-circular (non-circular opening 161 shown in phantom in FIG. 5B), which can facilitate removal of the shank portion from an axial opening 131 in the tip holding portion 127. The tool tip 123 can have a shank end 165 and a working end 163, and the axial opening 161 can extend from the shank end to the working end or from the shank end but only partially to the working end. The tool body 125 can comprise an opening 181 arranged to communicate with the axial opening 161 in the tool tip 123, which can be useful for, e.g., providing cooling or lubricating fluid to the tool tip.

The clamping ring 141 ordinarily has an abutment surface 167 extending generally transversely to the longitudinal axis L of the clamping ring 141. The clamping ring abutment surface 167 ordinarily contacts an abutment surface 169 of the tip holding portion 127 when the clamping ring 141 is in a mounted position relative to the tool body 125.

In a method of retaining a replaceable tip 123 in a tool 121 according to an aspect of the present invention, a tool tip 123 having a shank portion 135 is positioned such that the shank portion is disposed proximate a tip holding portion 127 of a tool body, the shank portion having at least one recess 137. At least one locking element 139 adapted to be received in the at least one recess 137 is positioned proximate the at least one recess. A clamping ring 141 is positioned around the shank portion 135 of the tool tip 123 such that the at least one locking element 139 is disposed between the at least one recess 137 and a locking element contacting surface 143 of the clamping ring 141. An interior diameter of a locking element contacting surface 143 of the clamping ring decreases in a circumferential direction. The clamping ring 141 is turned in a first direction D1 about a longitudinal axis of the tool body relative to the tool tip 123 such that the locking element contacting surface 143 contacts the at least one locking element 139 and urges it into the at least one recess 137 in the tool tip 123.

The locking element contacting surface 143 of the clamping ring 141 can comprise a protrusion 183, and the method can comprise turning the clamping ring 141 in the first direction D1 relative to the tool tip 123 so that the protrusion contacts the at least one locking element 139 and the clamping ring 141 deforms elastically outwardly as the at least one locking element 139 passes underneath the protrusion 183. When the clamping ring 141 is turned in the first direction D1 relative to the tool tip 123, the at least one locking element 139 can be moved from a non-retained position (FIGS. 5A-5B), in which the at least one locking element 139 is adapted to move radially out of the at least one recess 137, to a retained position (FIGS. 5C-5D), in which the at least one locking element 139 is not adapted to move radially out of the at least one recess, upon passing underneath the protrusion 183.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The disclosures in Swedish patent application No. 0700858-4, from which this application claims priority, are incorporated herein by reference.

While this invention has been illustrated and described in accordance with a preferred embodiment, it is recognized that variations and changes may be made therein without departing from the invention as set forth in the claims.

What is claimed is:
1. A tool with a replaceable tip, comprising:
a tool body comprising a tip holding portion;
a tool tip having a shank portion adapted to be disposed proximate the tip holding portion, the shank portion having at least one recess;
at least one locking element adapted to be received in the at least one recess; and
a clamping ring, an interior diameter of a locking element contacting surface of the clamping ring decreasing in a circumferential direction such that, when the clamping ring is disposed around the tool tip such that the at least one locking element is disposed between the locking element contacting surface and the at least one recess and the clamping ring turns in a first direction about a longitudinal axis of the tool body relative to the tool tip, the locking element contacting surface contacts the at least one locking element and urges it into the at least one recess in the tool tip wherein the locking element contacting surface of the clamping ring comprises a protrusion, the protrusion being disposed at a lesser distance from a longitudinal axis of the tool than the radially furthermost part of the at least one locking element when the at least one locking element is disposed in the at least one recess and, when the clamping ring turns in the first direction relative to the tool tip, the protrusion contacts the at least one locking element and the clamping ring deforms elastically outwardly.

2. The tool with the replaceable tip as set forth in claim 1, wherein the at least one locking element is a ball.

3. The tool with the replaceable tip as set forth in claim 1, comprising at least three each of the recess, the locking element, and the locking element contacting surface.

4. The tool with the replaceable tip as set forth in claim 1, wherein the clamping ring comprises at least two axially extending slots, the protrusion being disposed between the two slots.

5. The tool with the replaceable tip as set forth in claim 1, wherein the locking element contacting surface comprises a pocket defined at least in part by the protrusion, the locking element contacting surface being shaped such that the at least one locking element is in a non-retained position when the at least one locking element is disposed on a first side of the protrusion and being in a retained position in the pocket on a second side of the protrusion, the at least one locking element being adapted to move radially out of the at least one recess in the ion-retained position and being unable to move radially out of the at least one recess in the retained position.

6. The tool with the replaceable tip as set forth in claim 5, wherein the tool tip is a rotating tool that performs as cutting operation when the tool tip is rotated in a second direction opposite the first direction such that, during a cutting operation, torque on the tool tip will tend to move the tool tip toward the retained, position.

7. The tool with the replaceable tip as set forth in claim 1, wherein the clamping ring is axially retained on the tool body by a circlip in a circumferential recess on the tip holding portion.

8. The tool with the replaceable tip as set forth in claim 1, wherein the shank portion has an axial opening.

9. The tool with the replaceable tip as set forth in claim 8, wherein the axial opening is non-circular.

10. The tool with the replaceable tip as Set forth in claim 1, wherein the tool tip has a shank. end and a working end, and an axial opening extends from the shank end to the working end.

11. The tool with the replaceable tip as set forth in claim 1, wherein the recess is axially elongated.

12. The tool with the replaceable tip as set forth in claim 1, wherein the clamping ring has an abutment surface extending generally transversely to a longitudinal axis of the clamping ring, the damping ring abutment surface contacting an abutment surface of the tip holding portion when the clamping ring is in a mounted position relative to the tool body.

13. The tool with the replaceable tip as set forth in claim 1, wherein the tool is a rotating tool.

14. The tool with the replaceable tip as set forth in claim 1, wherein the tip holding portion comprises a wall defining an axial opening, the wall having at least one radial opening, the at least one locking element being disposed in the at least one radial opening, and, as the clamping ring is turned about the longitudinal axis of the tool body, the locking element contacting surface of the clamping ring contacts the at least one locking element and urges it through the at least one radial opening and into the at least one recess in the tool tip.

15. The tool with the replaceable tip as set forth in claim 1, wherein the tool body comprises an opening arranged to communicate with an axial opening in the tool tip.

16. A method of retaining a replaceable tip in a tool, comprising:
    positioning a tool tip having a shank portion such that the shank portion is disposed proximate a tip holding portion of a tool body, the shank portion having at least one recess;
    positioning at least one locking element adapted to be received in the at least one recess proximate the at least one recess;
    positioning, a clamping ring around the shank portion of the tool tip such that the at least one locking element is disposed between the at least one recess and a locking element contacting surface of the clamping ring, an interior diameter of a locking element contacting surface of the clamping ring decreasing in a circumferential direction; and
    moving the clamping ring relative to the tip holding portion such that the locking element contacting surface contacts the at least one locking element and urges it into the at least one recess in the tool tip,
    wherein the locking element contacting surface of the clamping ring comprises a protrusion, the method comprising turning the clamping ring in the first direction relative to the tool tip so that the protrusion contacts the at least one locking element and the clamping ring deforms elastically outwardly as the at least one locking element passes underneath the protrusion.

17. The method as set forth in claim 16, wherein moving the clamping ring is made by turning the clamping ring in a first direction about a longitudinal axis of the tool body relative to the tip holding portion.

18. The method as set forth in claim 16, wherein, when the clamping ring is turned in the first direction relative to the tool tip, the at least one locking element moves from a non-retained position, in which the at least one locking element is adapted to move radially out of the at least one recess, to a retained position, in which the at least one locking element is not adapted to move radially out of the at least one recess, upon passing underneath the protrusion.

* * * * *